(12) United States Patent  (10) Patent No.: US 8,224,514 B2
Center et al.  (45) Date of Patent: Jul. 17, 2012

(54) CREATION AND DEPLETION OF SHORT TERM POWER CAPABILITY IN A HYBRID ELECTRIC VEHICLE

(75) Inventors: Marc B. Center, Royal Oak, MI (US); William R. Cawthorne, Milford, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 972 days.

(21) Appl. No.: 12/212,943

(22) Filed: Sep. 18, 2008

(65) Prior Publication Data

US 2009/0118877 A1   May 7, 2009

Related U.S. Application Data

(60) Provisional application No. 60/985,222, filed on Nov. 3, 2007.

(51) Int. Cl.
*B60L 9/00* (2006.01)
(52) U.S. Cl. .......... 701/22; 701/54; 180/65.1; 180/65.2
(58) Field of Classification Search ........ 701/22, 701/54; 180/65.1, 65.2, 65.3
See application file for complete search history.

(56) References Cited

U.S. PATENT DOCUMENTS

| | | |
|---|---|---|
| 6,832,148 B1 | 12/2004 | Bennett |
| 6,868,318 B1 | 3/2005 | Cawthorne |
| 7,154,236 B1 | 12/2006 | Heap |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |

(Continued)

*Primary Examiner* — Toan To (57) ABSTRACT

Short term power limits of an electrical energy storage device are progressively tightened toward long term power limits in accordance with net energy flow or magnitude or duration metrics.

17 Claims, 6 Drawing Sheets

U.S. PATENT DOCUMENTS

| | | |
|---|---|---|
| 2006/0021809 A1 | 2/2006 | Xu et al. |
| 2006/0049797 A1 | 3/2006 | Hope et al. |
| 2006/0194670 A1 | 8/2006 | Heap |
| 2007/0029119 A1 | 2/2007 | Syed |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh et al. |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |

| | | | | | |
|---|---|---|---|---|---|
| 2009/0118948 A1 | 5/2009 | Heap | 2009/0118962 A1 | 5/2009 | Heap |
| 2009/0118949 A1 | 5/2009 | Heap | 2009/0118963 A1 | 5/2009 | Heap |
| 2009/0118950 A1 | 5/2009 | Heap | 2009/0118964 A1 | 5/2009 | Snyder |
| 2009/0118951 A1 | 5/2009 | Heap | 2009/0118969 A1 | 5/2009 | Heap |
| 2009/0118952 A1 | 5/2009 | Heap | 2009/0118971 A1 | 5/2009 | Heap |
| 2009/0118954 A1 | 5/2009 | Wu | 2009/0118999 A1 | 5/2009 | Heap |
| 2009/0118957 A1 | 5/2009 | Heap | 2009/0144002 A1 | 6/2009 | Zettel |

CREATION AND DEPLETION OF SHORT TERM POWER CAPABILITY IN A HYBRID ELECTRIC VEHICLE

CROSS REFERENCE TO RELATED APPLICATIONS

This application claims the benefit of U.S. Provisional Application No. 60/985,222 filed on Nov. 3, 2007 which is hereby incorporated herein by reference.

TECHNICAL FIELD

This disclosure pertains to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

The electrical energy storage device includes an maximum discharge and charge power at which the electrical energy storage device can discharge or charge at over extended time periods without damaging the electrical energy storage device. However, powertrain operations including transmission shifts, engine starts, and regenerative braking may require discharge or charge rates for short time periods that exceed the maximum discharge and charge rates. Therefore, it would be advantageous to provide short term power limits for the electrical energy storage device.

SUMMARY

A hybrid powertrain includes an electro-mechanical transmission coupled to an internal combustion engine and an electric machine to transmit mechanical power to an output member is described. A method for controlling the hybrid powertrain includes providing long term power limits of the electric energy storage device, determining short term power limits of the electric energy storage device based upon the long term power limits, and controlling power output of the hybrid powertrain system based upon the short term power limits of the electric energy storage device during an electrical energy storage device power excursion outside of the long term power limits.

BRIEF DESCRIPTION OF THE DRAWINGS

One or more embodiments will now be described, by way of example, with reference to the accompanying drawings, in which.

DETAILED DESCRIPTION

Figure 1:
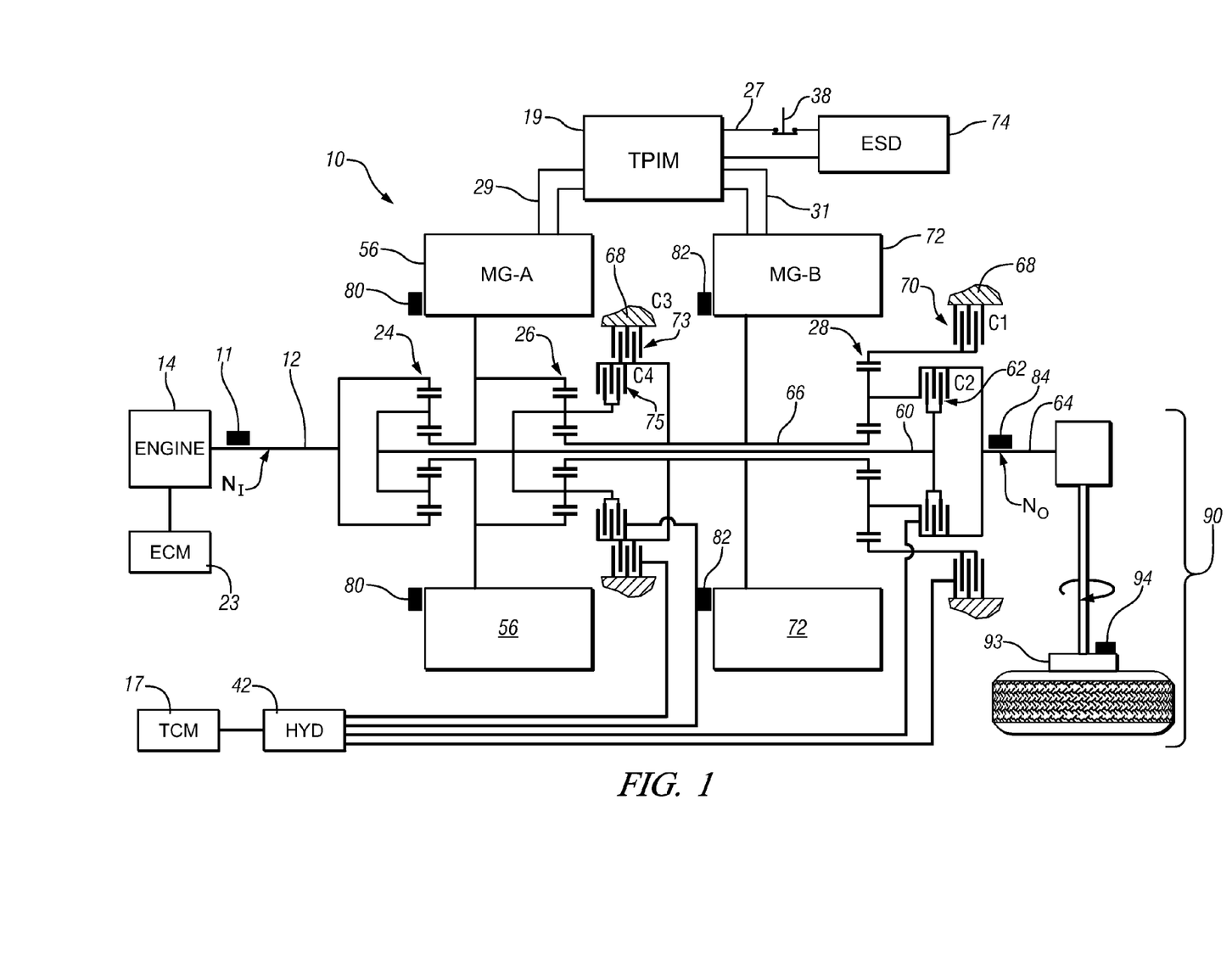
FIG. 1 is a schematic diagram of an exemplary powertrain, in accordance with the present disclosure.
Figure 2:
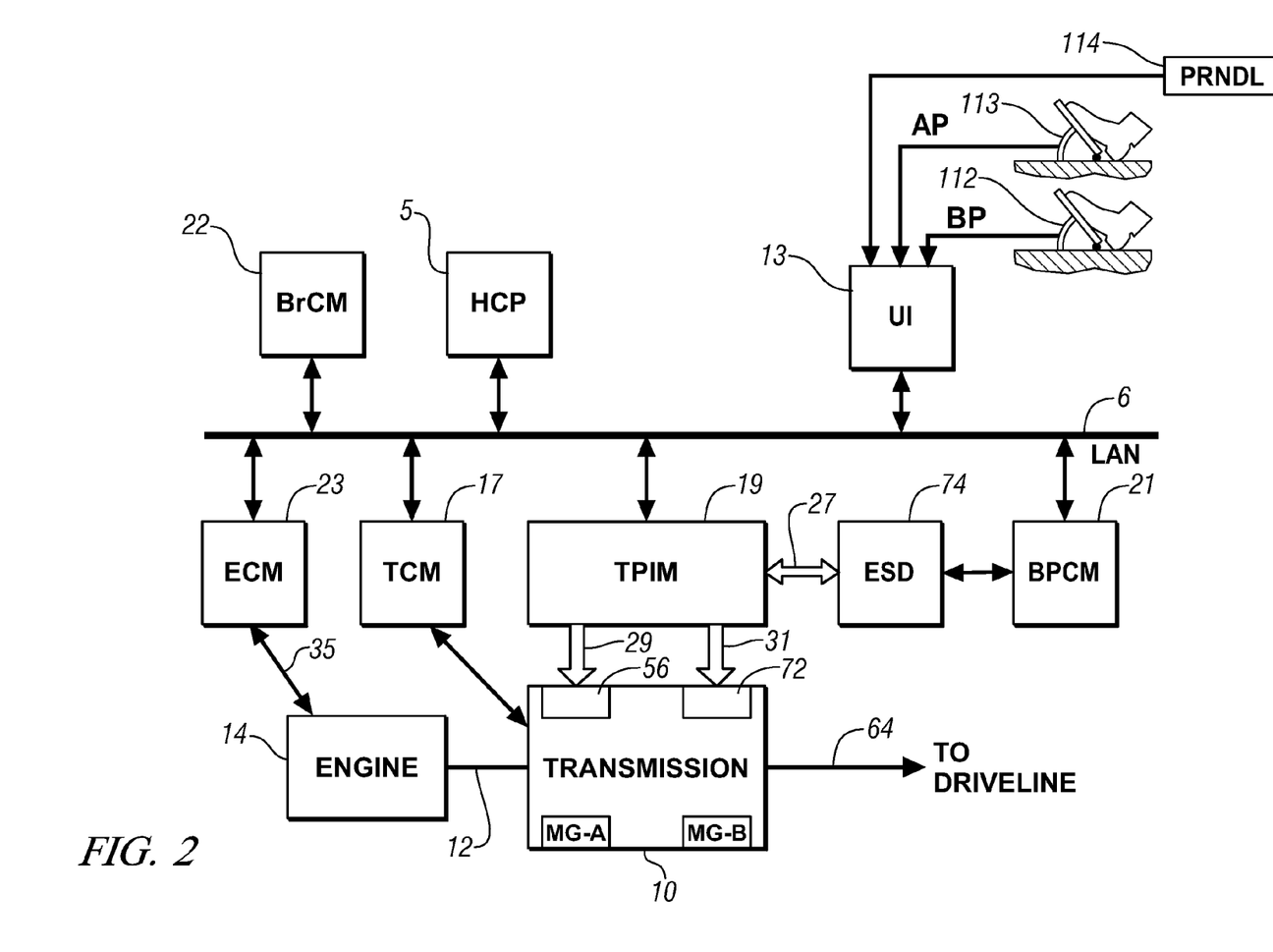
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, $V_{SS\text{-}WHL}$, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via respective ones of the transfer conductors 29 and 31 and transform it to or from three-phase AC power, which is conducted to or from the first and second electric machines 56 and 72 for operation as motors or generators.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time-based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and serial peripheral interface buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches |
| --- | --- | --- | --- |
| M1_Eng_Off | OFF | EVT Mode 1 | C1 70 |
| M1_Eng_On | ON | EVT Mode 1 | C1 70 |
| G1 | ON | Fixed Gear Ratio 1 | C1 70 C4 75 |
| G2 | ON | Fixed Gear Ratio 2 | C1 70 C2 62 |
| M2_Eng_Off | OFF | EVT Mode 2 | C2 62 |
| M2_Eng_On | ON | EVT Mode 2 | C2 62 |
| G3 | ON | Fixed Gear Ratio 3 | C2 62 C4 75 |
| G4 | ON | Fixed Gear Ratio 4 | C2 62 C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

Figure 3:
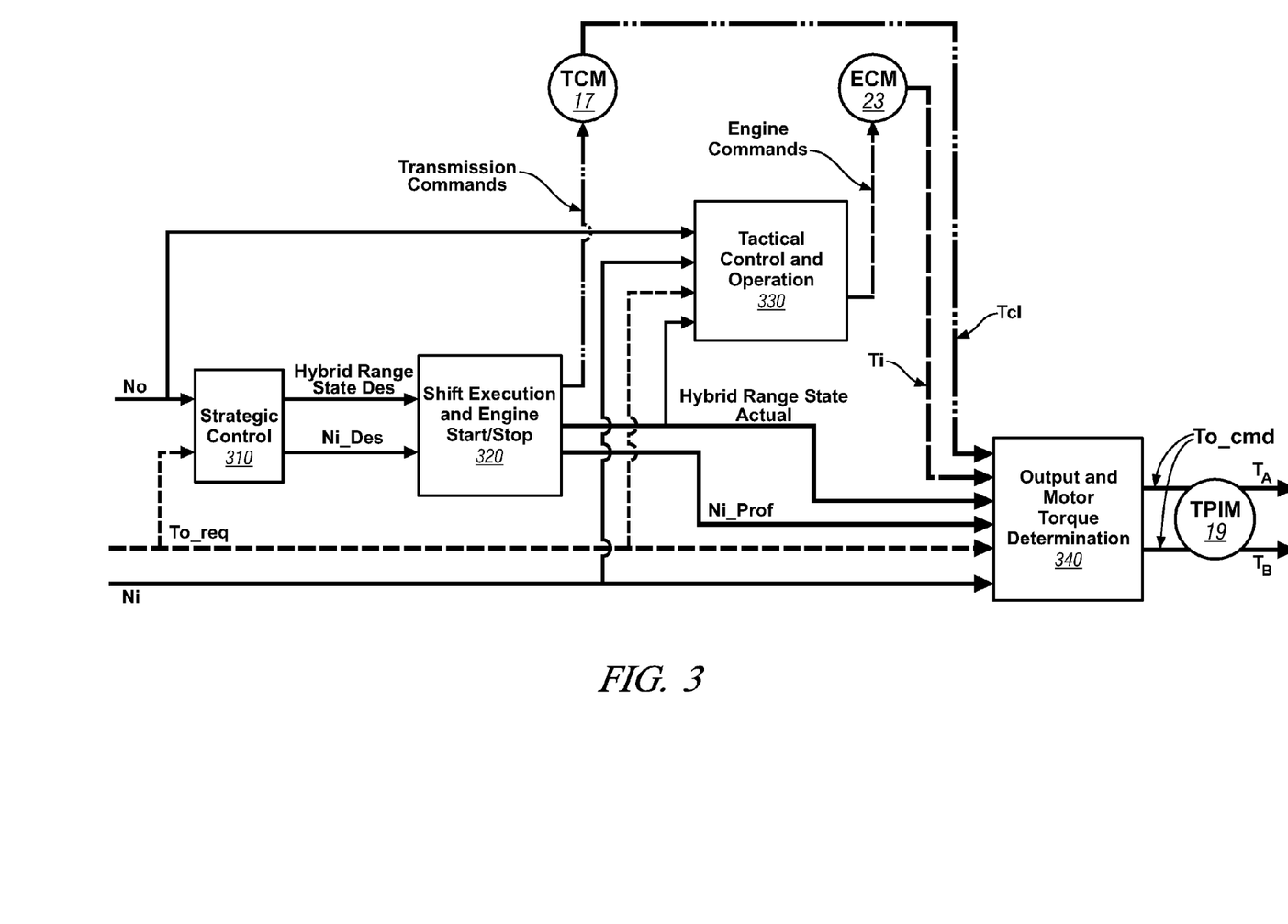
FIG. 3 is a parametric flow diagram, in accordance with the present disclosure.

FIG. 3 shows a control system architecture for controlling and managing torque and power flow in a powertrain system having multiple torque generative devices, described hereinbelow with reference to the hybrid powertrain system shown in FIGS. 1 and 2, and residing in the aforementioned control modules in the form of executable algorithms and calibrations. The control system architecture can be applied to any powertrain system having multiple torque generative devices, including, e.g., a hybrid powertrain system having a single electric machine, a hybrid powertrain system having multiple electric machines, and non-hybrid powertrain systems.

The control system architecture of FIG. 3 depicts a flow of pertinent signals through the control modules. In operation, the operator inputs to the accelerator pedal 113 and the brake pedal 112 are monitored to determine the operator torque request ('To_req'). Operation of the engine 14 and the transmission 10 are monitored to determine the input speed ('Ni') and the output speed ('No'). A strategic optimization control scheme ('Strategic Control') 310 determines a preferred input speed ('Ni_Des') and a preferred engine state and transmission operating range state ('Hybrid Range State Des') based upon the output speed and the operator torque request, and optimized based upon other operating parameters of the hybrid powertrain, including battery power limits and response limits of the engine 14, the transmission 10, and the first and second electric machines 56 and 72. The strategic optimization control scheme 310 is preferably executed by the HCP 5 during each 100 ms loop cycle and each 25 ms loop cycle.

The outputs of the strategic optimization control scheme 310 are used in a shift execution and engine start/stop control scheme ('Shift Execution and Engine Start/Stop') 320 to command changes in the transmission operation ('Transmission Commands') including changing the operating range state. This includes commanding execution of a change in the operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission.

A tactical control scheme ('Tactical Control and Operation') 330 is repeatedly executed during one of the control loop cycles to determine engine commands ('Engine Commands') for operating the engine, including a preferred input torque from the engine 14 to the transmission 10 based upon the output speed, the input speed, and the operator torque request and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state.

A clutch torque ('Tcl') for each clutch is estimated in the TCM 17, including the presently applied clutches and the non-applied clutches, and a present engine input torque ('Ti')

reacting with the input member 12 is determined in the ECM 23. A motor torque control scheme ('Output and Motor Torque Determination') 340 is executed to determine the preferred output torque from the powertrain ('To_cmd'), which includes motor torque commands ('$T_A$', '$T_B$') for controlling the first and second electric machines 56 and 72 in this embodiment. The preferred output torque is based upon the estimated clutch torque(s) for each of the clutches, the present input torque from the engine 14, the present operating range state, the input speed, the operator torque request, and the input speed profile. The first and second electric machines 56 and 72 are controlled through the TPIM 19 to meet the preferred motor torque commands based upon the preferred output torque. The motor torque control scheme 340 includes algorithmic code which is regularly executed during the 6.25 ms and 12.5 ms loop cycles to determine the preferred motor torque commands.

During ongoing powertrain operations, the BPCM 21 monitors operating parameters of the ESD 74 including electrical current, open circuit voltage, and temperature. The operating parameters are preferably monitored during one of the loop cycles or multiples of the loop cycles in the BPCM 21.

The ESD 74 exhibits physical power charge and discharge operating limits that are characteristic to the design and materials of the ESD 74. The operating limits include maximum charge power and discharge power that the ESD 74 can support without sustaining internal physical damage that can affect service life or performance of the ESD 74. The operating limits are described as long term power limits, also referred to as a steady-state limit. A maximum long term power limit describes the maximum discharge power of the ESD 74 over an extended time period, and a minimum long term power limit describes the maximum charge power of the ESD 74 over an extended time period. An extended time period with respect to long term power limits includes time periods in excess of short time periods with respect to short term power limits a described in further detail herein below. The maximum charge power and the maximum discharge power are referred to herein as the long term power limits. The long term power limits may be predetermined and can be based upon the state-of-charge and/or temperature of the ESD 74.

Powertrain operations, controlled through the HCP 5 in this embodiment, may require an electric power flow (discharge power or charge power) that exceeds one of the long term power limits for a period of time, referred to herein as a power excursion. Such powertrain operations include adjusting rotational speeds of the first and second electric machines 56 and 72 to synchronize clutch plates of one of clutches C1 70, C2 62, C3 73, and C4 75 during transmission shifts, rotating the first electric machine 56 to effect an engine start, and generating reactive power in the first and second electric machines 56 and 72 to generate electric power during a regenerative braking event. For operations that require a charge or discharge power greater than the long term power limits, the powertrain operations can control operation of the first and second electric machines 56 and 72 through the motor control modules and power inverters of the TPIM 19 to charge or discharge the ESD 74 limited by the short term power limit for short time periods, e.g., one to ten second time periods. A maximum short term power limit can be defined based upon the maximum long term power limit of the ESD 74, and a minimum short term power limit can be defined based upon the minimum long term power limit of the ESD 74. The maximum short term power limit can exceed the maximum long term power limit by a power magnitude or percentage of the long term maximum power; likewise the minimum short term power limit can exceed the minimum long term limit by a magnitude or percentage of the long term minimum power.

Figure 4:
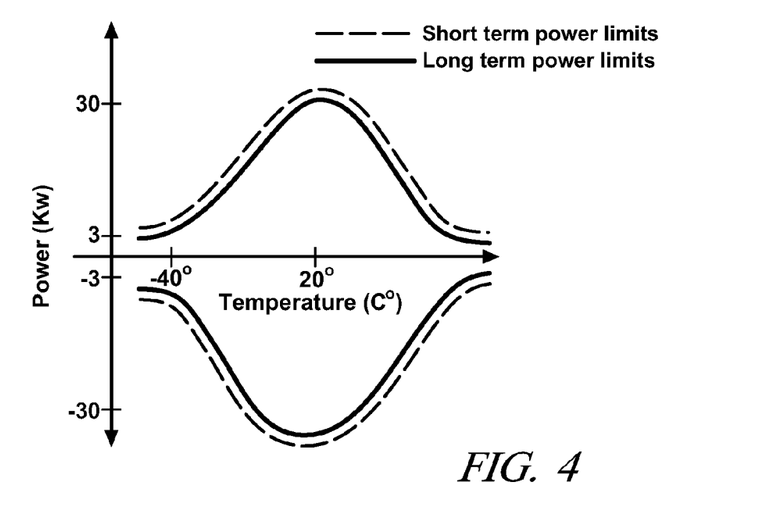
FIG. 4 graphically illustrates an exemplary short term and long term power limits over a temperature range, in accordance with the present disclosure.

FIG. 4 illustrates long term power limits and associated short term power limits based upon temperature. A short term power limit is said to exceed the corresponding long term power limit when the magnitude of the short term power limit exceeds the magnitude of the long term power limit. The exemplary short term power limits are depicted as a predetermined magnitude greater than the corresponding long term power limit magnitudes. Alternatively, the short term power limits can comprise a percentage increase over the long term power limits. The exemplary power limits vary over the operating temperature of the ESD 74, with the power limits at a maximum at operating temperatures around 20° C., and decrease with increasing or decreasing operating temperatures.

During vehicle operation, the short term power limits can fluctuate based upon an actual charging and discharging power that is in excess of the long term power limits by the ESD 74. When the actual charging or discharging power of the ESD 74 exceeds the long term power limits, the short term power limits can converge to the long term power limits. When the short term power limits converge to the long term power limits, the short-term power excursions of the ESD are limited. The short term power limits preferably converge to the long term power limits through a ramping function. The ramping function may be based on loop cycles on the BPCM 21 or HCP 5, and decrease the short term power limits incrementally for each loop cycle. There can be different methods to determine when to ramp the short term power limits to the long term power limits. A first approach is energy-based and a second approach is time-based.

Both the energy-based approach and the time-based approach control the maximum and minimum short term power limits. Both the maximum and minimum short term power limits are controlled substantially the same within the respective approaches. Hereafter, the discussion will describe the approach to controlling the maximum short term power limits, i.e. the maximum short term discharge power. One skilled in the art will recognize that the approach given for controlling the maximum short term power limit is applicable to the minimum short term power limit, i.e., the maximum short term charge power.

Figure 5:
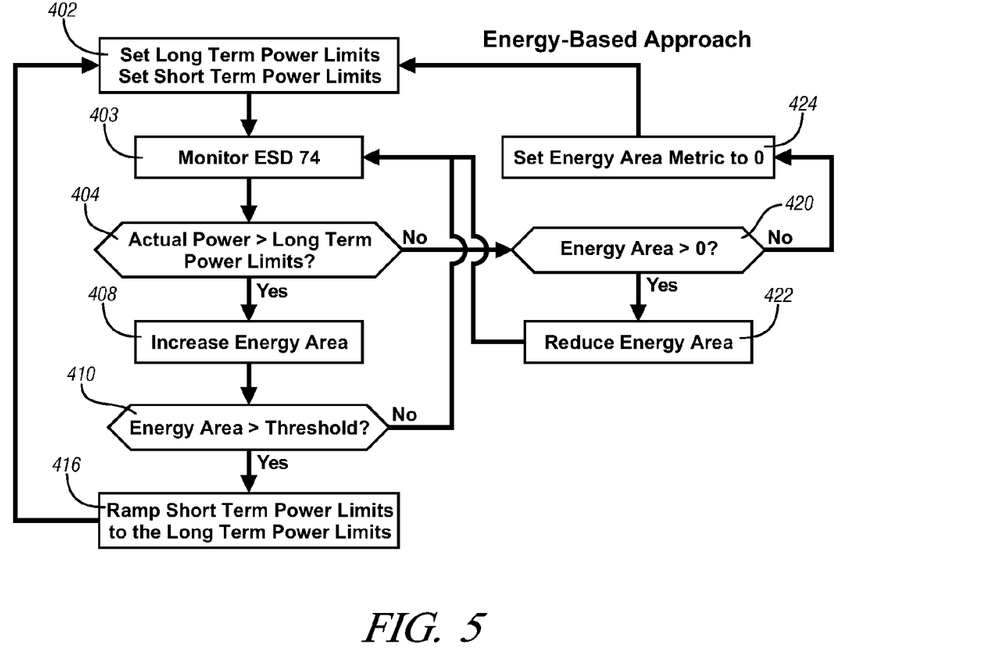
FIG. 5 is a flow chart illustrating the method for an energy-based approach to controlling the short term power limits, in accordance with the present disclosure.

FIG. 5 depicts a flow chart illustrating the energy-based method for controlling the short term power limits. The energy-based approach controls the short term limits based upon an energy area metric. The energy area metric comprises a measure of charging or discharging power flow from the ESD 74 that exceeds the long term power limits over an elapsed period of time.

During vehicle operations, the BPCM 21 monitors operating parameters of the ESD 74 including electrical current, open circuit voltage, and temperature (403). Long term power limits, described with reference to FIG. 4, are input into the system (402). Predetermined short term power limits are determined based upon the long term power limits. Short term power limits may be a predetermined percentage increase over the long term limits, or a predetermined power magnitude over the long term limits. The HCP 5 monitors the short term power limits, including the energy area metric.

The energy area metric may be determined using one of a plurality of methods. A first method for determining the energy area metric comprises integrating, as a function of time, the actual power output from the ESD 74. This is shown with reference to Eq. 1:

$$\int_0^{T} (\text{Actual Power} - LT \text{ Power Limit}) \frac{dp}{dt} \quad [1]$$

where t is the elapsed time period, Actual Power is the measured electric power during the elapsed time period, and LT Power Limit is the long term power limit at the temperature of the ESD 74. The energy area metric increases when the integral is positive and decreases when the integral is negative. The energy area metric may not decrease below zero.

Figure 6:
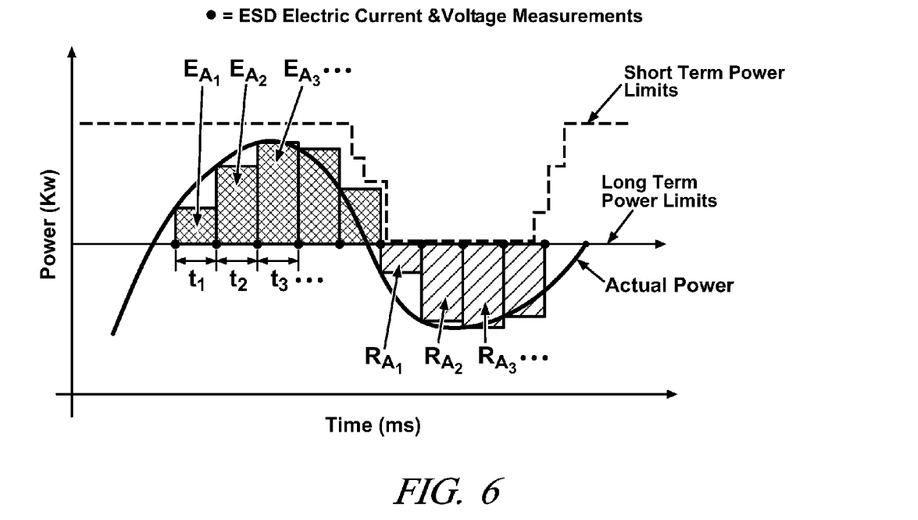
FIG. 6 graphically illustrates a method for calculating an energy area, in accordance with the present disclosure.

A second method for determining the energy area metric is illustrated in FIG. 6 and comprises adding electric energy ('$E_A$') and subtracting reduction areas ('$R_A$'). Electric energy is calculated by multiplying an output power in excess of the long term power limits with the elapsed time between power measurements. The reduction areas are calculated by multiplying the output power between the actual power and the long term power limits and the elapsed time between power measurements. Power measurements are based upon ESD current and ESD voltage measurements. As FIG. 6 depicts, ESD current and ESD voltage are measured periodically during ongoing powertrain operation.

When the energy area metric reaches a predetermined threshold value, the HCP 5 ramps down the short term power limits converging to the long term power limits. If actual power output is less than the long term power limits, the HCP 5 reduces the energy area metric. The energy area metric continues to increase if the actual power exceeds the long term power limits while the HCP 5 ramps the short term power limits to converge to the long term power limits. The energy area metric stops increasing when the actual power output is less than the long term power limits. After the HCP 5 ramps down the short term power limits to the long term power limits, the energy area metric is reduced when the actual power output is less than the long term power limits. When the energy area metric reduces to a second threshold, preferably zero, the HCP 5 ramps up the short term power limits to the predetermined short term power limits.

The short term power limits may be controlled using one of several methods. A first method for controlling the short term power limits using the energy-based approach comprises controlling the short term power limits based upon the energy area metric. The first method comprises establishing the long term power limits and short term power limits (402) and monitoring the ESD 74, including the actual power output (403).

The HCP 5 determines whether the actual power output from the ESD 74 exceeds the long term power limits (404). If the actual power exceeds the long term power limits, the HCP 5 increases the energy area metric as described hereinabove (408). The HCP 5 determines whether the energy area metric exceeds a predetermined threshold. If the energy area metric is less than the predetermined threshold the HCP 5 continues the method at block 403. If the energy area metric exceeds the predetermined threshold, the HCP 5 ramps the short term power limit to the long term power limit (416). The energy area metric is monitored again at block 403 wherein the energy area metric reduces to zero when the actual power output remains less than the long term power limits. The HCP 5 may ramp down the short term limits based upon a decaying function or may incrementally step the short term limits down based upon a step function. Once the energy area metric reduces to zero the HCP 5 ramps up the short term power limits to the predetermined short term power limits (402).

If the actual power is not greater than the long term power limit the HCP 5 determines if the energy area metric is greater than zero (420). If the energy area metric is greater than zero the HCP 5 ramps the energy area metric down a predetermined amount (422). If the energy area metric is not greater than zero the HCP 5 sets the energy area metric to zero (424) and reestablishes the short term power limits at block 402.

Figure 7:
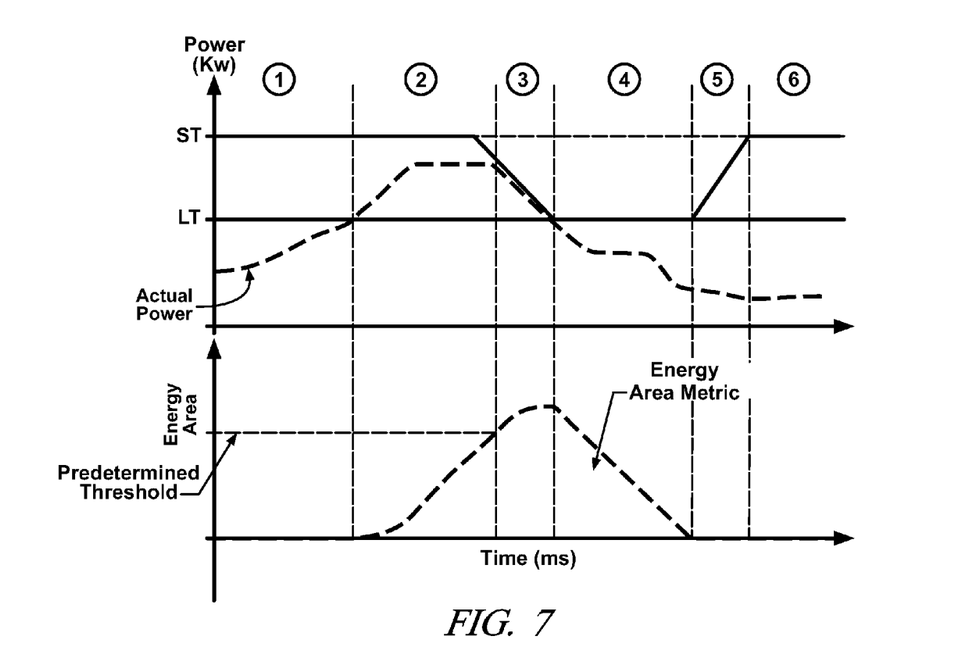
FIG. 7 graphically illustrates a method for controlling the short term power limits using the energy-based approach, in accordance with the present disclosure.

FIG. 7 graphically illustrates the first method for controlling the short term power limits based upon the energy area metric. Initially, the long term (LT) power limits are set, and the short term (ST) power limits are set based upon the long term power limits as shown in region 1 in FIG. 7. The energy area metric increases when the actual power output exceeds the long term power limits as shown in regions 2 and 3 in FIG. 7. When the energy area metric exceeds a threshold the short term power limits ramp down to the long term power limits as shown in region 3 in FIG. 7. When the actual power output is less than the long term power limits the energy area metric decreases until reaching zero as shown in region 4 in FIG. 7. When the energy area metric is zero the short term power limits are ramped up to the predetermined short term power limits as shown in region 5 in FIG. 7.

The HCP 5 can change the long term power limits at any time during the energy-based approach. Preferably, the long term power limits are determined before the short term power limits at block 402 in FIG. 5. Both the maximum and minimum short term power limits are concurrently determined. Once either energy area metric for the maximum short term power limit or the minimum short term power limit exceeds the threshold, both maximum and minimum short term power limits can be set to their respective long term limits until the HCP 5 commands them to ramp up to the predetermined short term power limits.

Figure 8:
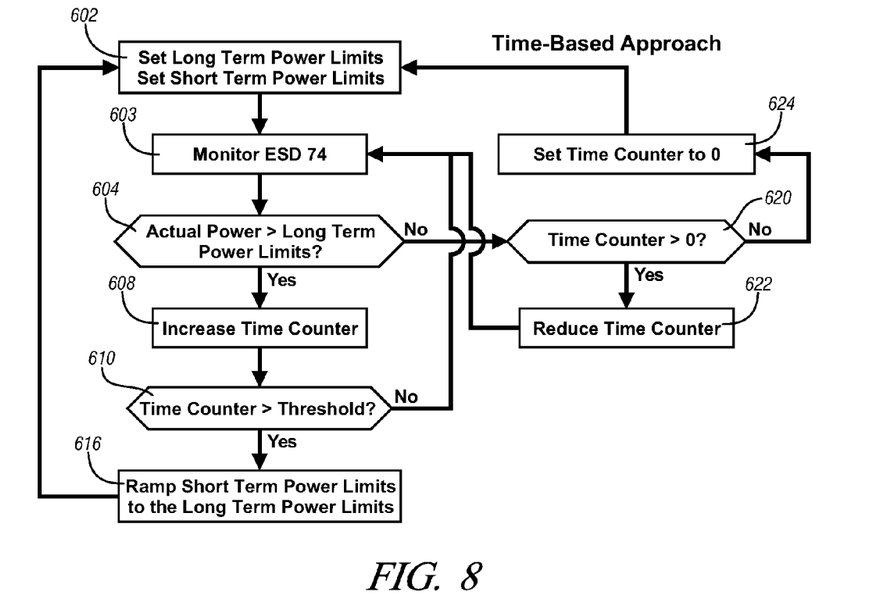
FIG. 8 is a flow chart illustrating the method for a time-based approach to controlling the short term power limits, in accordance with the present disclosure.

FIG. 8 depicts a flow chart illustrating the time-based method for controlling the short term power limits. During ongoing powertrain operations, the BPCM 21 monitors operating parameters of the ESD 74 including electrical current, open circuit voltage, and temperature (603). Long term power limits are input into the system. The long term power limits may be predetermined or may be determined based upon state-of-charge and/or temperature of the ESD 74. After the long term limits are set, the short term power limits are determined based upon the long term power limits (602). Short term power limits may be predetermined percentage increase over the long term limits, or a predetermined magnitude over the long term limits.

The time-based method controls the short term power limits based upon a time counter. The time counter monitors an elapsed time actual power exceeds the long term power limits. When the actual power exceeds the long term power limits, the time counter increases. When the actual power is less than the long term power limits, the time counter decreases. The time counter does not decrease below zero. The time counter is initialized at a predetermined amount, preferably zero, and is controlled by the HCP 5.

During vehicle operations, the HCP 5 determines whether the actual power output of the ESD 74 exceeds the long term power limits (604). When the HCP 5 determines that the power output exceeds the long term power limits, the HCP 5 increases the time counter (608).

If the actual power is not greater than the long term power limits, the HCP 5 determines if the time counter exceeds zero (620). If the time counter is greater than zero the HCP 5 will reduce the time counter a predetermined amount and continue the method at block 603. If the time counter is not greater than zero, the HCP 5 is set to zero (624) and continues the method at block 602.

After increasing the time counter, the HCP 5 determines whether the time counter exceeds a predetermined threshold (610). If the time counter exceeds the predetermined threshold, the HCP 5 ramps down the short term power limits to the long term power limits (616). Actual power output is monitored again at block 603 wherein the time counter will then reduce to zero when the actual power output remains less than the long term power limits. The HCP 5 may ramp down the short term limits and reduce the time counter based upon a decaying function or may incrementally step the short term limits down based upon a step function. The short term power limits may not be ramped down less than the long term power limits. After ramping down the short term power limits to the long term power limits, the HCP 5 continues the method at block 602.

Figure 9:
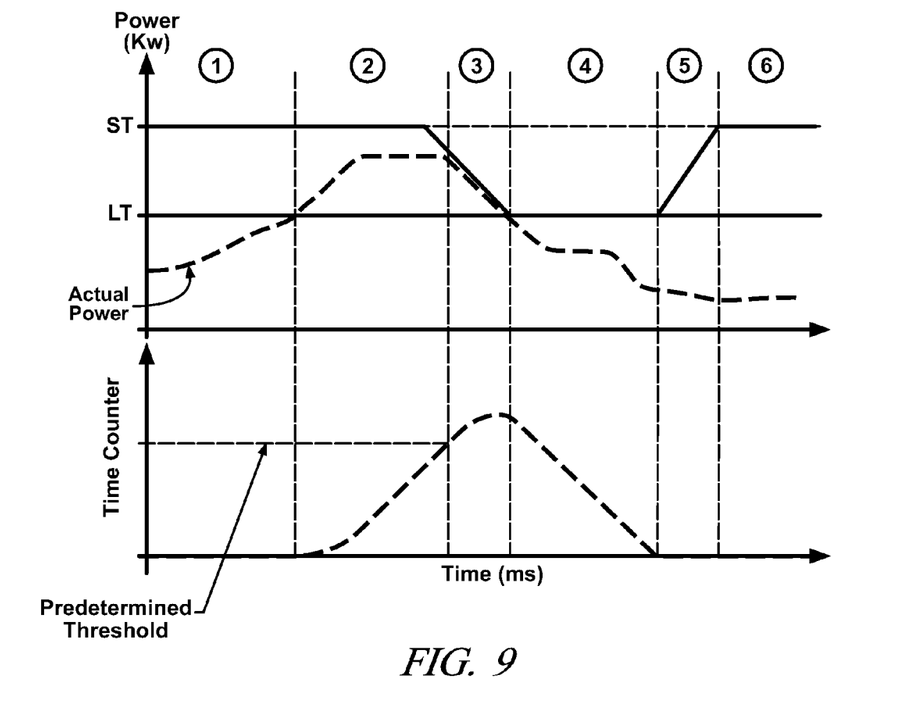
FIG. 9 graphically illustrates a method for controlling the short term power limits using the time-based approach, in accordance with the present disclosure.

FIG. 9 graphically illustrates the time-based method for controlling the short term power limits. Initially, the long term power limits are set and the short term power limits are set based upon the long term power limits as shown in region 1 in FIG. 9. The time counter increases when the actual power output exceeds the long term power limits as shown in regions 2 and 3 in FIG. 9. When the time counter exceeds the predetermined threshold the short term power limits ramp down to the long term power limits as shown in region 3 in FIG. 9. When the actual power output is less than the long term power limits, the time counter decreases until reaching zero as shown in region 4 in FIG. 9. When the time counter is zero the short term power limits are ramped up to the predetermined short term power limits as shown in region 5 in FIG. 9.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A method for controlling operation of a hybrid powertrain system based upon electric power limits for an electric energy storage device, comprising:
   providing long term power limits of the electric energy storage device;
   determining short term power limits of the electric energy storage device based upon the long term power limits;
   monitoring electric energy storage device power flow;
   controlling power output of the hybrid powertrain system based upon the short term power limits of the electric energy storage device during an electrical energy storage device power excursion outside of the long term power limits; and
   converging the short term power limits to the long term power limits when at least one of
      an energy area metric reaches a predetermined energy area metric threshold, the energy area metric comprising a measure of the electrical energy storage device power flow exceeding the long term power limits over an elapsed period of time, and
      a monitored elapsed time reaches a predetermined time threshold wherein the electrical energy storage device power flow exceeds the long term power limits.

2. A method for controlling operation of a hybrid powertrain system based upon electric power limits for an electric energy storage device, comprising:
   providing long term power limits of the electric energy storage device;
   determining short term power limits of the electric energy storage device based upon the long term power limits;
   controlling power output of the hybrid powertrain system based upon the short term power limits of the electric energy storage device during an electrical energy storage device power excursion outside of the long term power limits;
   determining an energy area metric based upon the long term power limits, an elapsed time, and an electrical energy storage device power flow; and
   converging the short term power limits to the long term power limits when the monitored energy area metric reaches a first predetermined threshold.

3. The method of claim 2, further comprising:
   calculating a difference between electric energy storage device power flow and the long term power limits; and
   determining the energy area metric by integrating said difference over the elapsed time.

4. The method of claim 2, further comprising:
   establishing the short term power limits to a predetermined level in excess of the long term power limits when the energy area metric is reduced to a second predetermined threshold.

5. The method of claim 1, wherein the short term power limits comprise one of a predetermined magnitude over the long term power limits and a predetermined percentage over the long term power limits.

6. A method for controlling operation of a hybrid powertrain system based upon electric power limits for an electric energy storage device, comprising:
   providing long term power limits of the electric energy storage device;
   determining short term power limits of the electric energy storage device based upon the long term power limits;
   controlling power output of the hybrid powertrain system based upon the short term power limits of the electric energy storage device during an electrical energy storage device power excursion outside of the long term power limits;
   determining electric energy storage device power flow;
   monitoring an elapsed time wherein electric energy storage device power flow exceeds the long term power limits;
   incrementing the monitored elapsed time when the actual power output exceeds the long term power limits;
   decrementing the monitored elapsed time when the actual power output is less than the long term power limits; and
   converging the short term power limits to the long term power limits when the monitored elapsed time reaches a first predetermined threshold.

7. The method of claim 6, further comprising:
   establishing the short term power limits to a predetermined level greater than the long term power limits when the monitored elapsed time reaches a second predetermined threshold.

8. The method of claim 1, wherein the power excursion results from hybrid powertrain system operation effecting one of clutch plate synchronization, engine starting, and regenerative braking.

9. The method of claim 1, wherein the short term power limits comprise a maximum short term power limit comprising a maximum discharge power limit of the electric energy storage device.

10. The method of claim 1, wherein the short term power limits comprise a minimum short term power limit comprising a maximum charge power limit of the electric energy storage device.

11. The method of claim 1, wherein the long term power limits comprise a maximum long term power limit comprising a maximum discharge power limit of the electric energy storage device over an extended time period.

12. The method of claim 1, wherein the long term power limits comprise a minimum long term power limit comprising a maximum charge power limit of the electric energy storage device over an extended time period.

13. A method for operating a hybrid powertrain system including an electro-mechanical transmission connected to an energy storage device, comprising;
  monitoring electric power flow between the electric energy storage device and the electro-mechanical transmission;
  determining a net energy change in the electric energy storage device based upon the electric power flow between the electric energy storage device and the electro-mechanical transmission and predetermined long term power limits;
  determining short term power limits of the electric energy storage device based upon the long term power limits and the net energy change; and
  controlling power output of the hybrid powertrain system based upon the short term power limits of the electric energy storage device.

14. The method of claim 13, further comprising:
  converging the short term power limits to the long term power limits when the net energy change reaches a first predetermined threshold; and
  controlling the short term power limits to a predetermined level greater than the long term power limits when the net energy change reaches a second predetermined threshold.

15. A method for operating of a hybrid powertrain system including an electro-mechanical transmission connected to an energy storage device, comprising;
  monitoring electric power flow between the electric energy storage device and the electro-mechanical transmission;
  determining a net elapsed time based upon the electric power flow between the electric energy storage device and the electro-mechanical transmission and predetermined long term power limits;
  determining short term power limits of the electric energy storage device based upon the long term power limits and the net elapsed time; and
  controlling power output of the hybrid powertrain system based upon the short term power limits of the electric energy storage device.

16. The method of claim 15, wherein determining a net elapsed time comprises:
  incrementing the net elapsed time when the power flow exceeds the long term power limits;
  decrementing the net elapsed time when the power output is less than the long term power limits.

17. The method of claim 16, wherein determining short term power limits comprises:
  converging the short term power limits to the long term power limits when the net elapsed time reaches a first predetermined threshold; and
  controlling the short term power limits to a predetermined level greater than the long term power limits when the net elapsed time reaches a second predetermined threshold.

* * * * *